106-18.31 SR
XR 3,592,910
X2027T
ADDED

United Sta[tes Patent]
3,592,910
July 13, 1971

3,592,910

COMPOSITIONS AND METHOD FOR CONTROLLING RELEASE OF PESTICIDES USING TERPENE POLYMERS

Arthur R. Clark and Margaret M. Clark, both of Spring Lake, N.J. 07081

No Drawing. Continuation-in-part of application Ser. No. 676,019, Oct. 18, 1967. This application Oct. 30, 1968, Ser. No. 771,975
Int. Cl. A01n *3/02, 17/00, 17/08*
U.S. Cl. 424—300 10 Claims

ABSTRACT OF THE DISCLOSURE

Liquid polyterpenes having a molecular weight of from 272 to 544 are applied to growing plants, particularly nursery stock and food crops, to provide the plants with a protective coating. The polyterpene coating inhibits the transpiration of water from the plants, enhances plant growth, and extends the life of plant nutrients and pesticides applied in combination with the polyterpenes.

This application is a continuation-in-part of application Ser. No. 676,019 filed Oct. 18, 1967, now abandoned.

THE TRANSPIRATION PROBLEM

Transpiration is the evaporation of water from plant tissue. The major water loss is through the leaves and usually occurs in two simultaneously operating stages; first, evaporation of water from the moist cell walls into the intercellular spaces of the leaf, and second, diffusion of the water vapor from the intercellular spaces, through the stomata, to the outside air. Loss of moisture through the stomata accounts for 95% of the total moisture loss due to transpiration.

If the evaporation of moisture from the leaves and branches by normal transpiration exceeds the amount absorbed through the roots, the plant eventually withers and dies. For example, plants and shubbery are severely injured and frequently killed by what is known as winter-kill, in which the foliage is subjected to extreme changes in temperature, while the frozen ground renders it impossible for the plant roots to draw sufficient moisture therefrom to compensate for that abstracted by air of low relative humidity. Plants in geographic areas having an arid climate, and those subjected to extended periods of draught are subject to severe injury due to transpiration.

Transpiration is also a major factor in the transplanting of trees, shrubbery and other plants. Many such plants are grown commercially in nurseries and are transplanted more than once before being removed to their final locations. In the course of transplanting operations the roots of such plants are unavoidably damaged so that the plant when replanted is unable to absorb moisture from the soil at its normal rate. In order to overcome excessive evaporation, leafy branches may be drastically pruned away. However, mortality of transplanted stock remains high.

Damage to plant roots, as for example in transplanting, as well as the deliberate pruning of the branches, expose the plants in a very critical period of their existence to infection by numerous plant pest, including fungus diseases, insect attacks, etc. Where plants are stored close together the spread of infections can be rapid.

Nursery stock, plant cuttings, roots and the like have been given protective and preservative coatings of various oils and waxes. Oils, in addition to being toxic to many varieties of plants, do not form adequately permanent films on the plant surfaces. Waxes are applied in a molten condition and such method of application involves a number of serious disadvantages. It is difficult to control the temperature of the hot wax, and it is therefore very easy to seriously injure plant like because of too high a temperature. When the wax is held at a temperature just slightly above the melting point, a thick film of wax is deposited because it solidifies very quickly with no drainage of excess material. A thick coating tends to flake off and transpiration becomes more rapid.

More recently gum-like compositions have been applied to plants as protective coatings, but such gum-like materials have their drawbacks. For example, natural gums lack uniformity. They are expensive and susceptible to attack by bacteria, fungi, etc. Because of this lack of uniformity, it is relatively difficult to predictably formulate the most effective composition for individual requirements. Further, plant treating compositions based on carboxymethyl cellulose yield brittle films, and the films themselves have relatively poor adhesion to plants, especially during handling.

Synthetic materials, such as rubber and vinyl latex compositions, have been applied to plants to check transpiration. These materials, in addition to being expensive, in many instances have not reduced the rate of transpiration to tolerable levels.

THE PESTICIDE PROBLEM

It is well known to use a sticker with pesticides. In the past materials such as glue, sugar, starches, etc. have been used as stickers. These materials wash away readily during the first rain. More recently, by-product materials and inexpensive resins have been used as sticking materials with more consideration being given to price than to performance. Some use has been made of acrylic polymers, styrenebutadiene copolymers, vinyl-acrylic copolymers, vinyl chloride polymers, etc. These materials are usually applied in latex form and coalesce by air-drying to an insoluble skin-type residue. For certain agricultural spray operations, as for example in airplane spraying, these materials dry and coalesce too rapidly and tend to form dry pellets that bounce off the leaves, or weather-off easily, due to failure to stick to the leaves.

Governmental regulations against the use of long residual types of chlorinated hydrocarbons has stimulated the development of chemical insecticides with shorter life duration as, for example, 1-naphthyl-N-methylcarbamate; O,O-diethyl-O-(2-isopropyl-6-methyl-4-pyrimidinyl) phosphorothioate, and O,O-dimethyl-S-(1,2-dicarbethoxyethyl) phosphorodithioate. With the development of such insecticides, a great need has arisen for a sticker for use with such insecticides that would aid in extending their residual life.

Biological insecticides such as *Bacillus thuringiensis* and virus have been restricted in their use due to the need for an additive to aid sticking, to provide ultraviolet protection, and to protect against weathering, etc., without killing the bacillus or virus before the biological insecticide is deposited on the leaves. Most additive and carrier materials, even water have a deleterious effect on the viability of the spores and on the physiology of cells germinating from spores.

Fungicides such as bordeaux mixture, manganous ethylene-bisdithiocarbamate, etc. require repeated applications during rainy periods as physical contact is most important in the control of fungi. Many fungi spread during the winter under the cover of snow when spraying is impossible. There is great need for an additive for fungicides which could protect the fungicide from removal from the plant to which it is applied due to weathering to provide control for several days, weeks or months without the need for multiple applications. This is true whether the application is made to the soil or above the ground. The need for a controlled-residue also exists for rodenti-

3592910 cides, herbicides, and repellents. The future pesticide developments point to chemical pesticides with shorter life residues that can be controlled by a residue control agent for specific lengths of time and to biological pesticides that can be applied without interference of the carrier and residue control agent.

GENERAL DESCRIPTION

A principal object of this invention is to provide synthetic compositions comprising liquid polyterpenes for application to growing plants to inhibit transpiration and promote healthy plant growth. Such liquid polyterpenes, whose chemical and physical properties are described more fully hereinafter, are economical to manufacture, and are compatible with other materials commonly used for treating plants. The term "plant" is used in this specification and appended claims to be inclusive of trees, shrubs, food crops, foliage, bushes, flowers, grass, etc.

Another principal object of this invention is the provision of pesticide compositions employing a liquid polyterpene as a sticking agent which provides controlled release of the pesticide, protects the pesticide against weathering action, and extends the life residual of the pesticide.

The term "pesticide" as used in this specification and appended claims includes insecticides, fungicides, bactericides, herbicides, rodenticides, repellents and like well known agricultural chemicals.

It was discovered that the above-enumerated problems, as well as others, can be overcome, and highly satisfactory results obtained by using as a coating medium for plants certain liquid polyterpenes, with or without additional ingredients, such as pesticides. These polyterpenes may be applied cold to plants in the form of water emulsions, solutions in organic solvents or in undiluted condition. Advantageously the emulsions and solutions can be applied by spraying. The undiluting liquid polyterpenes may be applied as for example dipping or painting. Regardless of the mode of application used, the liquid polyterpenes form a thin, substantially continuous coating or film on the plant foliage or roots.

As will be seen from the following discussion, the liquid polyterpenes employed in the method of this invention, in addition to reducing drastically the rate of transpiration of plants to which they are applied, control the rate of release, weathering action and life residual of pesticides which are employed in conjunction therewith. Furthermore, the liquid polyterpenes have been found to increase the yield of plant foliage and food crops to which they are applied.

THE LIQUID POLYTERPENES

The liquid polyterpenes employed in this invention may be obtained by the method described in United States Letters Patent No. 3,314,981 issued to Clark et al. on Apr. 18, 1967. According to this patent, liquid polyterpenes having an average molecular weight below 500 are prepared in high yield by polymerizing a polymerizable terpene or mixture of terpenes, e.g. turpentine, at 100–200° C. in the presence of an effective amount of a catalyst which is an anhydrous metallic halide of the general formula $MX_n$ in which M is a metal from the Friedel-Crafts type, X is a halide and $n$ is an integer from 2 to 4 and satisfies the valence of the metal M, which is non-gaseous at ambient temperatures or a complex of such a metallic halide. During the process there is formed a complex between the terpene and metallic halide at a temperature above about 100° C., following which the complex is slowly decomposed to permit cationic catalyst of the terpene to polymerize the terpene. During the latter step the temperature is maintained below about 200° C.

As to materials, the terpene can be any pure terpene, synthetic mixtures thereof, or naturally occurring terpene mixtures. Examples are alpha-pinene, beta-pinene, dipentene, terpinene, terpinolene, and various turpentines such as sulfate, wood, and gum. Of these the turpentine was preferred. American, Mexican, French, Russian, Spanish, etc. gum turpentines have been tried with approximately similar results and yields.

Examples of Friedel-Crafts catalysts are $AlCl_3$, $CrCl_3$, $AlBr_3$, $TiCl_4$, $SnCl_4$, $BeCl_2$, $FeCl_3$, $ZnCl_2$, $BiCl_3$, $SbCl_3$ and $ZrCl_4$. Of these, $AlCl_3$ is preferred.

The reaction conditions as well as the amount of anhydrous metal halide to terpene are important. They must be reacted at temperatures sufficiently high to form coordination complexes, such as $Al(X)_3Cl_3$ where X represents pinenes of various types as well as other terpenes within the turpentine mixtures found in various parts of the world.

As to proportions, the halide is added in the amount of about 0.1% to about 20%, based on the weight of the terpene. The preferred range is 3% to 5%. The amount of catalyst can vary dependent upon the moisture present in the terpene and the reactor system.

The coordination complexes are formed by adding about one-half of the total halide to the terpene and thoroughly mixing. Since the reaction is an exothermic one, heat is generated. The temperature rises and is kept within the range of about 100°–200° C. Additional amounts of halide are added during this period, and the temperature of the reaction is kept within these limits. The addition compound is formed in such a fashion that the decomposition compounds and penetration compounds are released from the polymer phase at the desired point of the reaction.

These liquid polyterpenes consist entirely of carbon and hydrogen and have the general formula

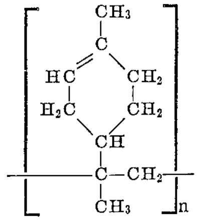

(I)

where $n$ is an integer from 2 to 4. Thus, the liquid polyterpenes have molecular weights ranging from 272 to 544. Ordinarily, the process of Pat. No. 3,314,981 will produce a mixture of different polyterpenes having an average molecular weight of from 300 to 400.

The liquid polyterpenes have an acid number of approximately zero, an average specific gravity of 0.95, an iodine number of approximately 98, an extremely low vapor pressure at room temperature, and a flash point of 330° F. They are relatively non-toxic to mammals and are non-toxic to plants when applied at the concentrations hereinafter set forth. However, since the polyterpenes have excellent film-forming properties, the films being resistant to air, light, and moisture penetration, high concentration may be phytotoxic to some plants.

As can be seen from Formula I, above, the liquid polyterpenes are short chain polymers. When deposited as a thin film and exposed to light and air, they slowly polymerize to form longer chain polymers of both linear and cross-linked structures. Unlike natural rubber latex or other film formers, the polymerization process is relatively slow, and weeks and even months are required before the soft initial polymers are transformed to a powder-like resin or rosin. During the polymerization process the initial semi-tacky film, which results after evaporation of water or organic solvent, is transformed into an intermediate non-tacky, flexible film.

The length of time for the development of each stage of polymerization depends upon the solvent used or the water composition applied, as well as the weather conditions. Transformation of the polymers into a non-tacky flexible film occurs in both indoor and outdoor applications. However, conversion to the powder-like resin generally only occurs in outdoor applications. As will be seen from later discussions, the progressive polymerization of the liquid polyterpenes has many advantages, particularly when used in combination with various pesticides or plant nutrients.

The permanency or weathering action of the polyterpene films is dependent upon the molecular weight of the polymers and the amount of impurities present. By employing the process of the Clark et al. Pat. No. 3,314,981 for producing polyterpenes for use in this invention, products having different molecular weights and different degrees of purity can be obtained. The higher molecular weight polymers with a given purity are more rapidly polymerized to the powdery state than those of lower molecular weight. The lower molecular weight terpene polymers must first polymerize to yield the higher molecular weight polymers before weathering action can occur. Those polymers which are less pure, e.g. contaminated with catalyst or reaction by-products, weather more rapidly than the corresponding purer forms. Thus, by controlling molecular weight and purity, terpene polymer compositions which exhibit weather breakdown ranging from several days to several months can be obtained.

THE POLYTERPENE COMPOSITIONS

As stated above, the liquid polyterpenes employed in the compositions and methods of this invention may be applied to plants and the soil about the roots of plants in the form of aqueous emulsions, as solutions in organic solvents, or in undiluted form.

Water emulsions may be prepared with the aid of emulsifiers. Any general type emulsifier can be used such as triethanolamine stearate, sodium lauryl sulfonate, sodium alkyl naphthalene sulfonate, sodium oleate, p,t-octylphenoxypolyethoxyethanol, as well as other well-known emulsifiers. The viscosity of the higher molecular weight terpene polymers, e.g. those having an average molecular weight of from 400 to 544, can be lowered by means of a suitable organic solvent of the types hereinafter listed to aid in emulsification.

Aqueous emulsions according to this invention may comprise 50% or more, by volume, of the liquid polyterpenes. Generally, the amount of polyterpenes present will depend upon the specific use for which the emulsion is designed and the method of application. Advantageously, rate of application of polyterpenes to plants can be readily controlled with a minimum of waste by controlling the concentration of polyterpenes in the emulsion. For most purposes, where spray application is to be employed the polyterpenes will be present in the emulsions in an amount of from about 1 to about 20% by volume. In these emulsions, the emulsifier will ordinarily comprise from about 0.01 to 1 percent by weight of the total composition.

The liquid polyterpenes are soluble in all aliphatic and aromatic hydrocarbon solvents, ketones (except acetone), high molecular weight alcohols, and chlorinated solvents. In making compositions suitable for use in this invention, preferably highly volatile solvents which are relatively non-phytotoxic to plants are employed. A preferred solvent is xylene because it quickly evaporates, thereby minimizing possible phytotoxic effects. Solvents of low volatility such as kerosene and superior oil should be used only on hardy plant foliage or bark. As with the aqueous emulsions, the solvent base compositions may contain 50% or more by volume of polyterpene, the selected concentration depending upon ultimate use and mode of application. More dilute solutions, e.g. those containing 20% or less of polyterpenes, are preferred where spray application is intended.

APPLICATION OF THE POLYTERPENE COMPOSITIONS

It was discovered that the application of the above-described liquid polyterpenes to plants produces a number of beneficial results. Of particular significance was the discovery that the liquid polyterpenes can be used to effectively control transpiration. The liquid polyterpenes when applied to plants as a spray in either the form of an aqueous emulsion or as a solution in an organic solvent form a substantially continuous coating on the plants. This coating forms a substantially water impervious barrier on the surface of leaves and other plant parts. The stomato actions are interfered with and the water transpiration is substantially stopped. The movement of oxygen and other transpiration gases is, however, apparently not impaired, as no phytotoxic symptoms are generally observed.

The following examples are merely illustrative of the application of this invention to the problem of water transpiration by plants and should not be construed as limiting the scope of the invention.

Example I

Plants were grown in waterproof containers, the tops of which containers were covered and sealed with two layers of polyethylene. The above ground portion of the plants extended through the layers of polyethylene. Water loss from the same containers which did not contain plants was negligible during the four week test period. The weight of each container was taken at the start of each test and again at specified intervals.

Like amounts of three different compositions were applied to different plants of the same species. Composition A comprised an aqueous emulsion containing 5% by volume of a mixture of polyterpenes having an average molecular weight of about 350. Compositions B and C comprised rubber latexes each containing 20% by weight of rubber solids. The data in Table I below show the percent water loss compared to the untreated control plants at the time specified.

TABLE I

Percent Water Loss

| | Composition A | | | | | Composition B | | | | | Composition C | | | | |
|---|---|---|---|---|---|---|---|---|---|---|---|---|---|---|---|
| Weeks from initial treatment | 1 | 2 | 3 | 4 | 5 | 1 | 2 | 3 | 4 | 5 | 1 | 2 | 3 | 4 | 5 |
| Plant species: | | | | | | | | | | | | | | | |
| Calif. privet (*Ligustrum ovalifolum*) | 24 | 26 | 29 | 43 | 40 | 54 | 63 | 68 | 76 | 88 | 38 | 38 | 43 | 50 | 58 |
| Arbor vitae (*Thuja occidentalisnigra*) | 5 | 4 | 4 | 5 | 8 | 70 | 79 | 82 | 92 | 94 | 50 | 63 | 65 | 73 | 78 |
| Horiz. juniper (*Juniperus horizontalis*) | 5 | 5 | 6 | 6 | 9 | 68 | 75 | 81 | 85 | 84 | 56 | 59 | 66 | 65 | 66 |
| Canadian hemlock (*Tsuga canadeniss*) | 9 | 9 | 9 | 9 | 9 | 54 | 67 | 57 | 58 | 57 | 30 | 24 | 23 | 22 | 22 |
| American holly (*Ilex opaca* "Hedge Holly") | 68 | 73 | 74 | 74 | 75 | 80 | 80 | 75 | 75 | 76 | 77 | 80 | 76 | 76 | 78 |
| Boxwood (*Buxus sempervirens* "New Port Blue") | 34 | 37 | 44 | 55 | 60 | 58 | 75 | 91 | 100 | 100 | 73 | 83 | 89 | 100 | 100 |

Example II

Four upright yews were drench sprayed with an aqueous emulsion containing 10% by volume of liquid polyterpenes having an average molecular weight of about 350–375. The yews were located approximately one and a half city blocks from the Atlantic Ocean along the northern coast of New Jersey. One week subsequent to spraying a typical "Northeaster" struck the area. The winds were severe, but there was very little rain. The yews evidenced substantially no damage, the protection provided by the coating of polyterpenes being at least 95% effective. Other yews and various evergreens in the area were observed to have suffered considerable damage due to water transpiration and by the salts and other chemicals deposited during the storm as evidenced by burn off of the new tender growth.

The amount of liquid terpene polymer applied to plants to inhibit transpiration of moisture will vary to some degree with the particular species of plant. Table II, below, lists various plant types and amounts of liquid terpenes, in terms of gallons per acre when applied as a spray, which have been found effective to inhibit transpiration. Although the application rates given are for pure polyterpenes, ordinarily the polyterpenes will be applied in the form of aqueous emulsions or solutions in volatile organic solvents of the type described hereinabove.

TABLE II (A) Needled evergreens—5 to 60 gallons/acre

Pines: White, Red, Sugar, Ponderosa, Longleaf, Scotch, Virginia
Firs: Douglas, Balsam, Norway, Common China
Spruce: Red, Black, White, Norway
Hemlock: Eastern, Canadian
Cedar: Eastern, Red
Yews: Common, Plum
Horizontal Juniper
Arbor-vitae
Cypress (B) Broadleaf evergreens—2 to 30 gallons/acre Azalea, Rhododendron, Pyracantha, Laurel, Boxwood, Ivy, Holly, California Privet (C) Vegetables—2 to 10 gallons/acre Tomatoes, Cabbage, Peppers, Potatoes, Peas, Beans, Corn, Cucurbits, Cole crops (D) Fruits—2 to 20 gallons/acre Apples, Peaches, Cherries, Oranges, Grapefruit, Grapes, Berries, Plums, Pears (E) Flowering Plants—2 to 10 gallons/acre Roses, Zinnia, Snapdragons, Poinsettia, Peony, Gladiolus, Geranium, Ferns, Camellia Cut flowers have always been a problem, and by coating these with a thin film of the liquid polyterpenes, either by spraying or dipping, transpiration therefrom can be greatly reduced so that they will maintain their freshness. Preferably, cut flowers are treated with aqueous emulsions containing from about 2 to about 10 percent by volume of liquid polyterpene.

Similarly Christmas trees which have been separated from their roots can be coated with liquid polyterpenes. The coating not only retains the moisture in the tree, but also aids in retaining the needles in place, giving the tree a fresh, natural appearance. Fireproofing agents, such as boric acid, may be included in the coating compositions, which ordinarily will be aqueous emulsions, to make the trees non-flammable, so that they can be used safely in such places as department stores, office buildings, homes, etc.

In addition, application of the liquid polyterpenes to growing Scotch Pine and Blue Spruce in the fall has been found to reduce the tendency of these evergreens to brown out in the fall.

As stated above, winter-drying or winter-kill is caused by the rapid loss of water from a plant at a time when the water in the soil is frozen and is not available to the plant. Strong winds, when the air temperature is either high or low, cause the leaves on the exposed side of the tree to lose water to such an extent that the tissues wilt and die. It was discovered that by coating evergreens with liquid polyterpenes according to this invention such winter-kill can be avoided and that the evergreens retain their green color throughout the winter. The rates of application for evergreens given in Table II, above, will provide adequate protection against winter-kill.

Another advantage of this invention is that the coating of liquid terpene polymers protects vegetation from airborne industrial waste, commonly referred to as "smog."

As can be seen from the following example, the roots of plants may be protected by being coated with the liquid terpene polymers, whereby the mortality rate on transplanting is greatly reduced.

Example III

Several types of needled evergreens were removed from the earth and the roots placed in packages in which they remained for about 3 to 4 weeks before being planted. Various materials were used to protect the roots while packaged. In Table III, below, are data showing the percent of the stock which survived two weeks after planting.

TABLE III
Percent of Stock Surviving

| Root preservative | White pine | White spruce | Scotch pine | Norway spruce |
|---|---|---|---|---|
| Excelsior | 94 | 87 | 95 | 94 |
| Clay | 97 | 90 | 90 | 80 |
| Polyterpene [1] | 95 | 91 | 100 | 91 |
| Unprotected (control) | 74 | 36 | 76 | 60 |

[1] Liquid polyterpene having an average molecular weight of 300–400; applied to roots as aqueous emulsion by dipping.

High temperatures interfere with the vital plant biological processes. It is, therefore, desirable to protect plants from excessive sun radiation in order to minimize heat shocks. As can be seen from the following example the liquid polyterpene coatings reflect radiation from leaf surfaces to which they are applied thereby lowering the surface temperature of the leaves exposed to direct sunlight.

Example IV

Tests were conducted on rhododendron leaves out of doors under three conditions of air temperature and light intensity. The temperatures of treated leaves in full sun were compared with those of untreated leaves in full sun and in 60 percent shade. The treated leaves had applied thereto two compositions, A and B. Composition A was an aqueous emulsion of liquid polyterpenes having an average molecular weight of 300 to 400 and containing about 5%, by volume, of polyterpenes. Composition B is the same as A but contains, in addition, aluminum powder.

TEMPERATURES OF LEAVES

| Treatments | Light intensity (ft.-c.) 700 | 8,500 | >10,000 |
|---|---|---|---|
| 1. Control (no treatment) | (a) | a+7.0 | a+4.0 |
| 2. Composition A | (a) | a+4.0 | a+1 |
| 3. Composition B | (a) | a+4.0 | (a) |

a Signifies the observed temperature and all "a's" are essentially the same temperature.

These results show that the liquid polyterpene coatings are effective for reflecting sun radiation.

The aluminum powder in Composition B is in the form of exceedingly thin platelets. Because of their shape, they deposit on surfaces in an overlapping fashion completely sealing the underlying material on which they are deposited from sunlight radiation. Agricultural experimenters have used this powder as a means of reducing the absorption of sun radiation by foliage of plants thereby achieving lower leaf surface temperatures. Consequently, the plants were not required to transpire as much water in order to hold the surface temperature to a range within their capacity to survive. The foregoing data show that polyterpenes alone are essentially as effective as polyterpenes with the aluminum dust.

INCREASED YIELDS OF PLANT FOLIAGE AND FRUIT

It was discovered that by means of the present invention the yields of plant foliage and fruit were unexpectedly increased. Apparently the liquid polyterpenes when applied to plants even at rates below those providing effective transpiration inhibition, e.g. rates as low as 0.5 gallon per acre, provide the plant foliage with protection against the damaging rays of sunlight. The lower foliage temperatures thereby provided allow for more efficient functioning of the enzymatic system of the plants.

Example V

Plots with growing tomato plants were sprayed with an aqueous emulsion of liquid polyterpenes having an average molecular weight of 300 to 400 at the rate of 0.5 gallon per acre. The emulsion comprised 0.5 gallon of liquid polyterpenes per 100 gallons of water. Other plots with growing tomato plants were left untreated.

When the crop was harvested, the treated plots had a yield of 260.8 pounds of tomatoes as compared to 200.1 pounds for the untreated plots, representing an increase in yield of approximately 30 percent.

Example VI

Four plot replications containing potato plants were sprayed with an aqueous emulsion comprising 0.25–2.5 percent by volume of a liquid polyterpene having an average molecular weight of 300–400, and approximately 0.12 percent, by weight of 1-naphthyl-N-methylcarbamate, using a logarithmic sprayer on a seven day schedule with successive skipping of the spraying of groups of plots in such manner that "A" plots were sprayed every three weeks, "B" plots were sprayed every two weeks, and "C" plots were sprayed weekly. Other plots (control) were sprayed weekly with an aqueous dispersion comprising 0.12 percent by weight of 1-naphthyl-N-methylcarbamate.

The results of these tests are set forth in Table IV, below.

TABLE IV

| | Yield (pound/plot) |
|---|---|
| Plots A (3 week spray schedule) | 10.7 |
| Plots B (2 week spray schedule) | 10.9 |
| Plots C (1 week spray schedule) | 11.3 |
| Control (1 week spray schedule) | 10.6 |

The data in Table IV show that plots sprayed with the composition of this invention containing a liquid polyterpene produced yields of potatoes equivalent to the control composition which was applied on a weekly basis. The data further established that the composition of this invention, when applied on a weekly basis produced a 10 percent increase in yield, as compared to the control.

Example VII

Twenty-four plots containing growing tomato plants were sprayed in such manner that there were three replications. Half of the plots were sprayed with an aqueous emulsion containing 0.25 gallon of a liquid polyterpene having an average molecular weight of 300–400 and 2 pounds of a fungicide having the formula $$15CuO \cdot 10ZnO \cdot 6Cr_2O_3 \cdot 25H_2O$$

per 100 gallons of water. The other half was sprayed with a similar composition containing 0.5 gallon of the liquid polyterpene per 100 gallons of water.

Four spray intervals were used so that some plots were sprayed every 5 days, others every 10 days, still others every 15 days, and finally others every 25 days.

Three control plots containing tomato plants were sprayed every 5 days with an aqueous dispersion containing 2 pounds of the fungicide per 100 gallons of water.

TABLE V

| Treatment No. | Polyterpene gallons/100 gallons water | Application frequency in days | Yield results, lbs./plot |
|---|---|---|---|
| 1 | 0.5 | 5 | 68.4 |
| 2 | 0.5 | 10 | 52.6 |
| 3 | 0.5 | 15 | 61.1 |
| 4 | 0.5 | 25 | 40.6 |
| 5 | 0.25 | 5 | 58.2 |
| 6 | 0.25 | 10 | 44.6 |
| 7 | 0.25 | 15 | 55.6 |
| 8 | 0.25 | 25 | 68.9 |
| 9 | 0.05 | 10 | 58.5 |
| 10 | [1] 0.00 | 5 | 46.5 |

[1] Control.

The improved yields obtained by this invention as shown in Table V are believed to be due not only to the protection of the plants from the sun's rays by the polyterpene, but also to the maintaining of Cu and Zn nutritional values for better plant metabolism. This residual life function of the liquid polyterpenes is discussed hereinbelow in connection with improved pesticide compositions provided by this invention.

Example VIII

Plots of tomato plants were treated with aqueous emulsions containing 0.5 gallon of a liquid polyterpene having an average molecular weight of 300–400 and different fungicides. A norm of 260 pounds of tomatoes per plot was established for similar compositions containing no polyterpene. The increase in yield obtained using compositions of this invention, expressed in percent increase over the norm is set forth in Table VI, below.

TABLE VI

| Fungicide | Rate, lbs./100 gal./acre | Percent increase in yield |
|---|---|---|
| Tetrachloroisophthalonitrile | 0.5 | 1.5 |
| Do | 1.5 | 20.0 |
| 2,4-dichloro-6-(o-chloroanilino)-s-triazine | 1 | 4.2 |
| Polyethylene polymer (80%) cis-N-[(1,1,2,2-tetrachloroethyl) thio]-4-cyclohexene-1,2-dicarboximide (39%) | [1] 2.5 | 5.4 |
| Manganese ethylenebisdithiocarbamate (80%) | 1.5 | 2.2 |
| Coordination product of zinc and manganese ethylenebisdithiocarbamate | 1.5 | 9.9 |

[1] Pints per 100 gallons of water per acre.

Advantageously, the compositions of this invention can contain plant nutrients. By reason of the film forming properties of the polyterpenes such nutrients are made available to the plant over an extended period of time, thereby further improving crop yields. The nutrients may be inorganic or organic and may comprise plant growth regulators.

PESTICIDE LIFE EXTENSION

There are a number of factors which have a bearing on the loss of pesticides from plant foilage. Among these are rain and wind erosion, photochemical decomposition and volatilization. As stated previously materials heretofore suggested for use as stickers for pesticides have not been found to be particularly satisfactory for extending the useful life of pesticides while making the pesticide available for protection of the plant. For example, vinyl polymer and rubber latex emulsions have been suggested for use as stickers. Unfortunately these film formers physically lock up the pesticide making it unavailable for protection of the plant. On the other hand, the more soluble stickers are soon removed by rain.

A particularly unique feature of the liquid polyterpenes employed in this invention is their ability to be converted to a powder, either at an early stage or a late stage after their application to a plant, depending upon their molecular weight and purity. This powdering effect releases the pesticide gradually and at the proper time. For example, the lowest molecular weight polymers of highest purities can be used for releasing a pesticide in the spring after application in late summer or early fall of the previous year. Thus spraying can be carried out in the fall to control white pine weevil the following spring.

On the other hand, where more rapid release of the pesticide is desired, e.g. gradual release over a period of a few days or a few weeks, higher molecular weight and/or less pure terpene polymers may be employed in the pesticide compositions.

The liquid terpene polymers have excellent sticking properties, level well, and adhere well to the surface of leaves and other plant parts. They reduce the pellet effect on airplane spraying under arid conditions. Sprays containing them are fluid and have the good spreading qualities required of hydraulic drench sprays.

The use of low molecular weight terpene polymers with biological insecticides such as *Bacillus thuringiensis* has created means for application by airplane spray with no reduction of activity due to addition of foreign materials for extending purposes. The terpene polymer protects the *Bacillus thuringiensis* against UV light in the aerial spray as well as on the surface residue. There is no deleterious effect on the viability of the spores and on the physiology of cells germinating from the spores. After application, the spray residue shows viable spores and viable crystals for two to four weeks. The residue control agent extends the life two to four times longer than previously observed in the field and indicates that the lower molecular weight terpene polymers are very effective in preserving the Bacillus thuringiensis.

The low molecular weight terpene polymers with various weathering effects due to impurities have proven useful on reducing the number of applications needed for fungi control. Too frequently there is lack of control due to the fungicide washing away during heavy rains. The present residue control compositions may be used for fungi control whether it be for one week or six months.

The use of low molecular weight terpene polymers for residue control is most important for soil or plant contact wherein the pesticides used are insecticides, rodenticides, herbicides, or repellents. The compositions of this invention have proven effective in extending the life of the pesticide to the desired length of time by controlling weathering effects as described previously.

Of specific importance is the fact that with the pesticide compositions of this invention, the residual life of those insecticides with shorter life duration, for example, 1-naphthyl-N-methylcarbamate, and the like, can be greatly extended.

The resistance of the pesticide compositions of this invention to rain erosion is shown by the following example.

Example IX

A composition comprising equal proportions of pesticide and liquid polyterpene life extender having an average molecular weight of 300–400 was applied to the surface of 8" x 10" glass panels. Other similar panels were merely coated with pesticide (control). Still other panels were coated with similar compositions in which the liquid polyterpene was replaced with an equal amount of either an acrylic or a rubber latex. The panels were air dried in the laboratory, exposed to sunlight for a minimum of eight hours, and eroded with rain.

Subsequently the panels were stripped in solvent and the presence of residual pesticide was determined by chromatographic means. The results are set forth in Table VII, below.

TABLE VII

Rain Erosion Study

| Pesticide composition | Rain, inches | Percent pesticide retained |
|---|---|---|
| Liquid polyterpene and $15CuO \cdot 10ZnO \cdot 6Cr_2O_3 \cdot 25H_2O$ (fungicide) | 1 | 77 |
| Control (same fungicide) | 1 | 0 |
| Rubber latex and 1-naphthyl-N-methylcarbamate. | 2.5 | 5 |
| Liquid polyterpene and 1-naphthyl-N-methylcarbamate | 2.5 | 24 |
| Acrylic latex and 1-naphthyl-N-methylcarbamate | 2.5 | Trace |
| Control (same insecticide) | 0.25 | 0 |
| Liquid polyterpene and 2,4-dichloro-6-o-chloroanilino-s-triazine | 1 | 66 |
| Control (same fungicide) | 1 | 0 |

In the pesticide compositions of this invention, the pesticide preferably is relatively insoluble in water, for there is a tendency for water-soluble forms to be leached out, leaving the polyterpene film intact.

The pesticide compositions of this invention may be prepared by adding the pesticide to the aqueous emulsions or organic solvent systems. The amount of pesticide added will depend upon the particular chemical used and the particular application.

The following examples illustrate the preparation of various pesticide compositions according to this invention.

Example X

Two hundred parts of American gum turpentine are heated to 125–130° C. and allowed to cool to 60° C. Two and one-half (2½) parts of anhydrous aluminum chloride ($AlCl_3$) are added immediately with stirring not allowing the temperature to rise above 125–130° C. range. Small increments of anhydrous aluminum chloride are added with cooling to remain below the 125–130° C. range until a total of three (3) parts of anhydrous aluminum chloride are added. The mixture is cooled to 70–80° C. with the addition of 150 parts of heptane and allowed to reflux shortly after the addition of two parts of anhydrous aluminum chloride. The temperature is raised gradually to 155° C. and allowed to cool to 80° C. At this point 150 parts of heptane are mixed with the polyterpene and the solution is decanted and filtered to remove all the solid phase derived from the aluminum chloride-pinene addition compound. The treated heptane polymer is mixed with 30 parts of $CaCO_3 \cdot MgCO_3$ plus 300 parts of water and mixed thoroughly until all the soluble catalyst is removed and a very light color results in the heptane phase. The solids are removed via filtration and the water separated from the heptane phase. The heptane is stripped off leaving a liquid polymer.

The liquid terpene polymer is used in the pesticidal composition as follows:

(1) 0.08 lbs. gamma-benzene hexachloride is dissolved in 6.4 fl. ozs. xylene (2) 1.00 pint of liquid terpene polymer (ave. M.W. 300–400) is mixed to 0.64 fl. oz. p,t-octylphenoxypolyethoxyethanol with heat until thoroughly mixed, (1) and (2) are mixed together and diluted with water to one gallon. This material is then mixed and sprayed by hydraulic drench spray to evergreens in October to control the white pine weevil the following April or May in the Northeastern United States. A similar spray application without the low molecular weight terpene polymer will have no effect on the white pine weevil due to the fact that gamma-benzene hexachloride has a very short life activity. The liquid terpene polymer acts as a residue control agent of the insecticide spray.

Example XI

The procedure as given in Example X is repeated, but 50 parts of ammonia water are used in place of thirty parts of $CaCO_3 \cdot MgCO_3$ for the neutralization. After thorough mixing, the water is separated from the heptane phase. The heptane is stripped off leaving a reddish-brown liquid polymer (ave. M.W. 300–400). The liquid terpene polymer is used in the pesticide composition as follows:

1 lb. 1-naphthyl-N-methylcarbamate is mixed with 4 fl. ozs. of the low molecular weight terpene polymer and 0.16 fl. oz. p,t-octylphenoxypolyethoxyethanol.

The mixture is diluted with enough water to make 1 gallon of spray. The composition is applied to trees by spraying from an airplane at the rate of 1 gallon per acre to control gypsy moth. The liquid terpene polymer made according to this example is less pure than that of Example X and will powder relatively rapidly. This action releases the 1-naphthyl-N-methylcarbamate for the 14 to 21 days. The same spray without liquid terpene polymer is active for only 6 to 7 days under the most ideal weather conditions.

Example XII

The same procedure as given in Example X is used to make the liquid terpene polymer which is used in a pesticide composition as follows:

(1) 0.08 lb. gamma-benzene hexachloride is dissolved in 6.40 fl. ozs. xylene (2) 1.00 pint liquid terpene polymer is mixed to 0.64 fl. oz. p,t-octylphenoxypolyethoxyethanol.

(1) and (2) are mixed together and diluted with water to one gallon. This material is then mixed and sprayed on evergreens by hydraulic drench spray. The gamma-benzene hexachloride will be active 3 to 5 weeks. Application is made in April for white pine weevil control.

Example XIII

The procedure of Example X is used to make the terpene polymer. The liquid terpene polymer is used in a pesticide composition as follows:

1.82 lbs. tetramethylthiuramdisulfide are mixed with 6.4 fl. ozs. liquid terpene polymer and 0.26 fl. oz. p,t-octylphenoxypolyethoxyethanol.

This mixture is diluted with enough water to make one gallon, and may be applied as a spray, dip or brush application for the protection of nursery stock, fruit trees and oranamentals against animal feeding damage. The terpene polymer releases the tetramethylthiuramdisulfide very slowly, giving protection from rabbit, deer, and meadow mice damage from six to ten months.

Example XIV

The procedure of Example X is used to make the terpene polymer. The liquid terpene polymer is used in a pesticide composition as follows:

1 oz. manganous ethylenebisdithiocarbamate is mixed with 1 fl. oz. terpene polymer and 0.04 fl. oz. p,t-octylphenoxypolyethoxyethanol.

This mixture is diluted with enough water to make one gallon, and applied as a drench spray for fungi control. The terpene polymer releases the manganous ethylenebisdithiocarbamate very slowly giving fungi control during the period of one week to six months.

Example XV

The terpene polymer is made according to Example X. The terpene polymer is used in a pesticide composition as follows:

1 pint *Bacillus thuringiensis*—E. C. is mixed with 6 fl. ozs. terpene polymer and 0.12 fl. oz. t,p-octylphenoxypolyethoxyethanol.

This mixture is diluted with enough water to make one gallon of spray, and is applied to trees by airplane at the rate of two gallons per acre for control of gypsy moth. The terpene polymer more than doubles the active life of the *Baccillus thuringiensis*. The biological insecticide is active for two to four weeks. Without the terpene polymer, the biological insecticide is active for only one to seven days.

Example XVI

The procedure of Example XI is used to make the terpene polymer. The liquid terpene polymer is used in a pesticide composition as follows:

0.23 fl. oz. 2,4-dichlorophenoxyacetic acid are mixed with 1.00 fl. oz. terpene polymer and 0.04 fl. oz. p,t-octylphenoxypolyethoxyethanol.

This mixture is diluted with water to make one gallon, and applied as a drench spray for herbicidal action. The terpene polymer releases the 2,4-dichlorophenoxyacetic acid rather rapidly as compared to the terpene polymer manufactured according to Example X. However, the spray residue sticks to the plant and soil without washing away and releases the herbicide over a shorter period of time.

Example XVII

The procedure of Example X is used to make the terpene polymer. The liquid terpene polymer is used in a pesticide composition as follows:

0.08 lb. benzene hexachloride is dissolved in 6.4 fl. ozs. xylene and mixed with 1.00 pint terpene polymer.

This mixture is diluted with Fuel Oil #2 to one gallon. This composition is then mixed and sprayed via mist blower for bark beetle control on dead or cut logs in forests or forest park areas. The spray is applied in early June, and the pesticide is active for the entire summer season.

Pesticide compositions according to this invention containing liquid polyterpene and 1-naphthyl-N-methylcarbamate are particularly useful in control of bole weevil in cotton plants.

What is claimed is:

1. A plant treating composition consisting of an effective amount of (1) a pesticide selected from the group consisting of insecticides, fungicides, bactericides and herbicides, or (2) an animal repellent and a sticking agent for controlling the release of said pesticide or repellent consisting of a liquid terpene polymer having a molecular weight from 272 to 544, and obtained by reacting a terpene selected from the group consisting of alpha-pinene, beta pinene, dipentene, and mixtures thereof, and an effective amount of an anhydrous metallic halide that is non-gaseous at ambient temperature having the formula $MX_n$ in which M is a metal of the Friedel-Crafts type, X is a halide and *n* is an integer from 2 to 4, and satisfies the valence of the metal M, to form a coordination complex of the terpene and metallic halide, and slowly decomposing the complex to permit the catalyst to polymerize said terpene, the temperature of the reaction being kept above 100° C. during formation of the complex and below about 200° C. during decomposition of the complex and catalytic polymerization of the terpene.

2. A composition according to claim 1 in which said terpene polymer comprises a mixture of terpene polymers having an average molecular weight of form 300 to 400.

3. A composition according to claim 1 in which said pesticide comprises 1-naphthyl-N-methylcarbamate.

4. A plant treating composition consisting of an effective amount of (1) a pesticide selected from the group consisting of insecticides, fungicides, bactericides and herbicides, or (2) an animal repellent, water, an emulsifier and a sticking agent for controlling the release of said pesticide or repellent consisting of a liquid terpene polymer having a molecular weight from 272 to 544, and obtained by reacting a terpene selected from the group consisting of alpha-pinene, beta-pinene, dipentene, and mixtures thereof, and an effective amount of an anhydrous metallic halide that is non-gaseous at ambient temperature having the formula $MX_n$ in which M is a metal of the Friedel-Crafts type, X is a halide and *n* is an integer from 2 to 4, and satisfies the valence of the metal M, to form a coordination complex of the terpene and metallic halide, and slowly decomposing the complex to permit the catalyst to polymerize said terpene, the temperature of the reaction being kept above 100° C. during formation of the complex and below about 200° C. during decomposition of the complex and catalytic polymerization of the terpene.

5. A plant treating composition consisting of an effective amount of (1) a pesticide selected from the group consisting of insecticides, fungicides, bactericides and herbicides, or (2) an animal repellent, an inert volatile organic solvent and a sticking agent for controlling the release of said pesticide or repellent consisting of a liquid terpene polymer having a molecular weight from 272 to 544, and obtained by reacting a terpene selected from the group consisting of alpha-pinene, beta-pinene, dipentene, and mixtures thereof, and an effective amount of an anhydrous metallic halide that is non-gaseous at ambient temperature having the formula $MX_n$ in which M is a metal of the Friedel-Crafts type, X is a halide and *n* is an integer from 2 to 4, and satisfies the valence of the metal M, to form a coordination complex of the terpene and metallic halide, and slowly decomposing the complex to permit the catalyst to polymerize said terpene, the temperature of the reaction being kept above 100° C.

during formation of the complex and below about 200° C. during decomposition of the complex and catalytic polymerization of the terpene.

6. The method of treating plants which comprises applying thereto a composition consisting of an effective amount of (1) a pesticide selected from the group consisting of insecticides, fungicides, bactericides, and herbicides, or (2) an animal repellent and a sticker for controlling the release of said pesticide or repellent consisting of a liquid terpene polymer having a molecular weight from 272 to 544, and obtained by reacting a terpene selected from the group consisting of alpha-pinene, beta-pinene, dipentene and mixtures thereof, and an effective amount of an anhydrous metallic halide that is non-gaseous at ambient temperature having the general formula $MX_n$ in which M is metal of the Friedel-Crafts type, X is a halide and $n$ is an integer from 2 to 4 and satisfies the valence of the metal M to form a coordination complex of the terpene and metallic halide, and slowly decomposing the complex to permit the catalyst to polymerize said terpene, the temperature of the reaction being kept above 100° C. during formation of the complex and below about 200° C. during decomposition of the complex and catalytic polymerization of the terpene.

7. The method according to claim 6 in which said terpene polymer comprises a mixture of terpene polymers having an average molecular weight of from 200 to 400.

8. The method according to claim 6 in which said pesticide comprises 1-naphthyl-N-methylcarbamate.

9. The method of treating plants which comprises applying thereto a composition consisting of an effective amount of (1) a pesticide selected from the group consisting of insecticides, fungicides, bactericides, and herbicides, or (2) an animal repellent, water, an emulsifier and a sticker for controlling the release of said pesticides or repellent consisting of a liquid terpene polymer having a molecular weight from 272 to 544, and obtained by reacting a terpene selected from the group consisting of alpha-pinene, beta-pinene, dipentene and mixtures thereof, and an effective amount of an anhydrous metallic halide that is non-gaseous at ambient temperature having the general formula $MX_n$ in which M is a metal of the Friedel-Crafts type, X is a halide and $n$ is an integer from 2 to 4 and satisfies the valence of the metal M to form a coordination complex of the terpene and metallic halide, and slowly decomposing the complex to permit the catalyst to polymerize said terpene, the temperature of the reaction being kept above 100° C. during formation of the complex and below about 200° C. during decomposition of the complex and catalytic polymerization of the terpene.

10. The method of treating plants which comprises applying thereto a composition consisting of an effective amount of (1) a pesticide selected from the group consisting of insecticides, fungicides, bactericides, and herbicides, or (2) an animal repellent, an inert volatile organic solvent and a sticker for controlling the release of said pesticide or repellent consisting of a liquid terpene polymer having a molecular weight from 272 to 544, and obtained by reacting a terpene selected from the group consisting of alpha-pinene, beta-pinene, dipentene and mixtures thereof, and an effective amount of an anhydrous metallic halide that is non-gaseous at ambient temperature having the general formula $MX_n$ in which M is a metal of the Friedel-Crafts type, X is a halide and $n$ is an integer from 2 to 4 and satisfies the valence of the metal M to form a coordination complex of the terpene and metallic halide, and slowly decomposing the complex to permit the catalyst to polymerize said terpene, the temperature of the reaction being kept above 100° C. during formation of the complex and below about 200° C. during decomposition of the complex and catalytic polymerization of the terpene.

References Cited

UNITED STATES PATENTS

| | | | |
|---|---|---|---|
| 2,761,805 | 9/1956 | Huldobro et al. | 424—352 |
| 3,009,855 | 11/1961 | Lambrech | 424—300 |
| 3,095,438 | 6/1963 | Kauer | 260—93.3 |
| 3,220,994 | 11/1965 | Clark et al. | 260—93.3 |
| 3,281,319 | 10/1966 | Potts et al. | 71—65 |
| 3,314,981 | 4/1967 | Clark et al. | 260—448 |
| 3,342,673 | 9/1967 | Kaufman et al. | 424—275 |
| 3,366,539 | 1/1968 | Woodbury | 424—218 |
| 3,408,175 | 10/1968 | Schuh | 71—65 |
| 3,413,109 | 11/1968 | Vartiak | 71—65 |
| 3,318,769 | 5/1967 | Folckemer et al. | 424—78 |

OTHER REFERENCES

Ritter et al., J. Am. Chem. Soc. 62, 1508–1509 (1940).

LEWIS GOTTS, Primary Examiner

M. KASSENOFF, Assistant Examiner

U.S. Cl. X.R.

47—58, Dig. 11; 71—1, 65, 68, 79, 85, 117, 127, Dig. 1; 106—15, 285; 117—3; 424—78, 81, 83, 93, 131, 141, 145, 212, 249, 274, 286, 304, 328, 352, 358, 363, 200

PO-1050
(5/69)

UNITED STATES PATENT OFFICE
CERTIFICATE OF CORRECTION

Patent No. 3,592,910 Dated July 13, 1971

Inventor(s) Arthur R. Clark and Margaret M. Clark

It is certified that error appears in the above-identified patent and that said Letters Patent are hereby corrected as shown below:

Column 2, line 2, "like" should read -- life --.

Column 4, line 71, "weather" should read -- weathering --.

Column 8, line 15, "94" should read -- 95 --.

Column 8, line 15, "95" should read -- 94 --.

Column 8, line 42, "(ft.-c.)" should read -- (f.c.) --.

Signed and sealed this 22nd day of February 1972.

(SEAL)
Attest:

EDWARD M.FLETCHER,JR.
Attesting Officer

ROBERT GOTTSCHALK
Commissioner of Patents